United States Patent [19]

Brockmann

[11] 3,781,589

[45] Dec. 25, 1973

[54] FIELD DEFLECTION CIRCUIT

[75] Inventor: Hans-Jürgen Brockmann, Halstenbek, Germany

[73] Assignee: U.S. Philips Corporation, New York, N.Y.

[22] Filed: Nov. 15, 1971

[21] Appl. No.: 198,832

[30] Foreign Application Priority Data

Nov. 28, 1970 Germany.................. P 20 58 631.6

[52] U.S. Cl. ............................................ 315/27 TD

[51] Int. Cl. ............................................ H01j 29/70

[58] Field of Search ................... 315/27 TD, 28, 29, 315/27 R

[56] References Cited

UNITED STATES PATENTS

| | | | |
|---|---|---|---|
| 3,602,768 | 8/1971 | Williams | 315/27 TD |
| 2,964,673 | 12/1960 | Stanley | 315/27 TD |
| 3,441,791 | 4/1969 | Beck | 315/27 GD |

*Primary Examiner*—Carl D. Quarforth
*Assistant Examiner*—J. M. Potenza
*Attorney*—Frank R. Trifari

[57] ABSTRACT

A field deflection circuit in which the deflection coil is connected to a direct voltage source during the flyback period so as to reverse the polarity of the deflection current. For this purpose the deflection coil is connected through a switch controllable connected to the direct voltage source, which switch is controlled by the difference between a voltage proportional to the steep-edged sawtooth input signal and a voltage proportional to the deflection current. This difference is considerable during the flyback period and is utilized for switching on the controllable switch; it becomes zero as soon as the deflection current has reached its required value at which the switch is switched off again. It is thus achieved that the polarity reversal is always terminated when the required value is reached, even when the direct voltage fluctuates and also when the inductive load is changed.

8 Claims, 1 Drawing Figure

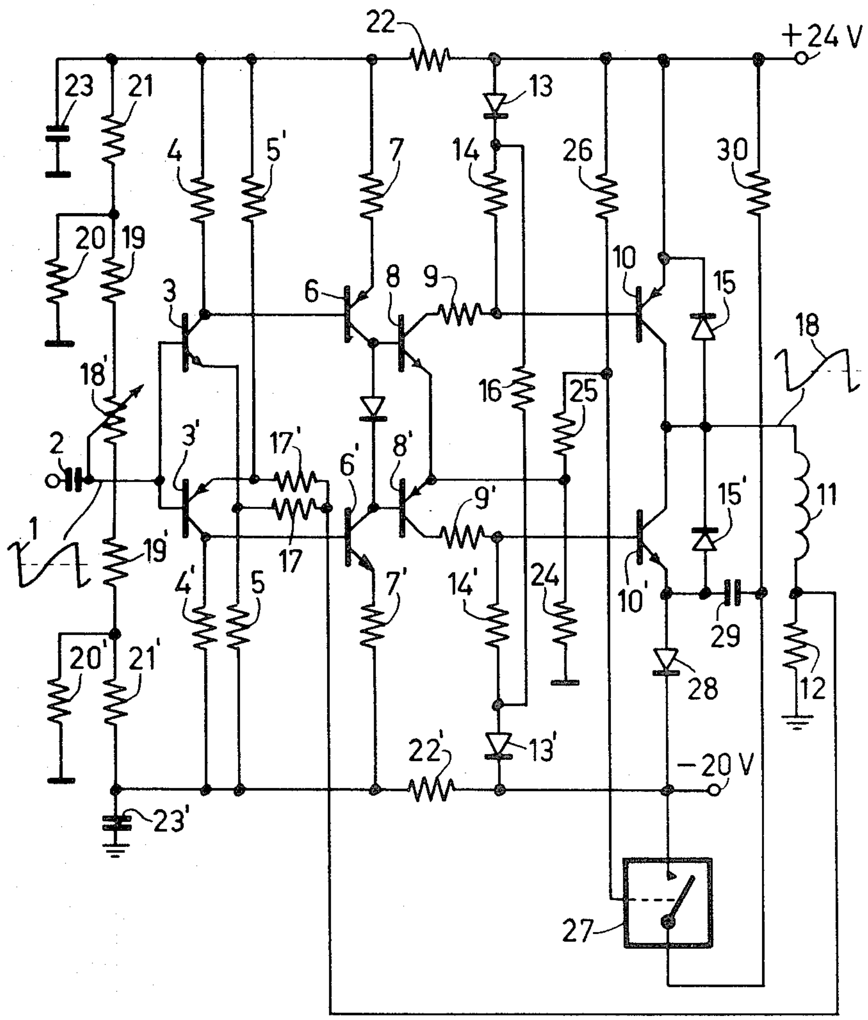
INVENTOR.
HANS-JURGEN BROCKMANN
BY
AGENT

FIELD DEFLECTION CIRCUIT

The invention relates to a field deflection circuit including an amplifier whose input conveys a saw-tooth signal whose polarity changes at the commencement of the flyback period within a period of time which is very short as compared with the flyback period, the field deflection coil being connected to the output of said amplifier, and a controllable switch by means of which the deflection coil is connected to a direct voltage source at the commencement of the flyback pulse for the purpose of reversing the polarity of the deflection current.

As compared with a vertical deflection circuit in which the deflection coil with an additionally arranged capacitor is constituted as a part of a resonance circuit, which circuit performs an unattenuated half oscillation during the flyback period whereby considerable voltage amplitudes at the output of the amplifier circuit occur, the advantage of such a deflection circuit is that the direct voltage to which the deflection coil must be connected is not so high, so that transistors having a slight collector breakdown voltage can be used. In a circuit arrangement of the kind described in the preamble and in U.S. Pat. No. 3,070,727 the flyback voltage depends on the height of the direct voltage, the inductance of the deflection coil and the maximum deflection current in accordance with the relation $T = LI/U$, in which T denotes the duration of the polarity reversal, I denotes the height of the deflection current (measured from peak to peak), L denotes the inductance of the deflection coil and U denotes the height of the direct voltage.

In a known circuit arrangement of this kind the input of the controllable (transistor) switch is connected to the output of the amplifier through the series arrangement of a capacitor and a resistor. At the commencement of the flyback period the sawtooth voltage changes from its positive to its negative maximum value while a negative pulse becomes available through the RC member at the input of the transistor switch, which pulse causes this transistor to conduct and which connects the deflection coil to a negative direct voltage so that the current flowing through the coil is reversed in polarity. The duration of this polarity reversal depends on the time constant of the RC member before the input of the transistor switch. In case of fluctuations of the direct voltage to which the deflection coil is connected during the flyback period, the amplitude of the current reached by the deflection current during this polarity reversal of course also changes so that the scan period commences either at a too low or at a too high value of the vertical deflection current. Since in addition, as stated, the period of time during which the deflection coil must be connected to the direct voltage depends on the inductance of the deflection coil, the time constant of the RC member must be adapted to the inductance of the deflection coils.

An object of the present invention is to obviate these drawbacks and to provide a circuit arrangement in which the deflection coil is connected to the direct voltage as long as is necessary for reaching the amplitude of the deflection current required for the commencement of the scan period and in which an adaptation is not necessary when the inductance of the deflection circuit changes, for example, by including a transformer for the North-South raster correction.

Starting from a vertical deflection circuit of the kind described in the preamble this object is achieved according to the invention in that the controllable switch is controlled by the difference between a voltage which is proportional to the sawtooth signal and a voltage which is proportional to the deflection current, said two voltages and/or the switch being dimensioned in such a manner that the deflection coil is separated from the direct voltage by means of the switch as soon as the current flowing through the deflection coil has reached the value required for the commencement of the scan period.

The invention is based on the regulation of the fact that the sawtooth signal at the input of the amplifier and the current flowing through the vertical deflection coil have substantially the same variation throughout the scan period; during the flyback period the sawtooth signal is, however, reversed in polarity within a few microseconds, while the polarity reversal for the deflection current is considerably slower due to the limited direct voltage present at the deflection coil. These differences in the variation with time between the input signal and the deflection current may be utilized for the purpose of rendering the switch operative, which switch becomes inoperative again as soon as the deflection current has reached its value required for the commencement of the scan period, because then no difference exists any longer between the sawtooth input signal and the deflection current.

According to a further embodiment of the invention the voltage proportional to the deflection current is applied as a feedback voltage to the input of the amplifier and the controllable switch is connected to a point of the amplifier whose potential exceeds a threshold value only during the flyback period, which threshold value renders the controllable switch operative.

In order that the invention may be readily carried into effect, an embodiment thereof will now be described in detail by way of example with reference to the accompanying diagrammatic drawing. In this embodiment a class B push-pull amplifier is used which, as is known, has a lower dissipation then a class A amplifier for a determined deflection output. The amplifier is substantially symmetrical so that two corresponding parts are denoted by two corresponding reference numerals (for example, 12, 12').

The input signal 1 is applied through a capacitor 2 of 10 $\mu$F to the interconnected bases of the input transistors 3 and 3'. The collector of npn-transistor 3 is connected through a resistor 4 of 1.5 kOhms to the positive supply voltage terminal, while its emitter is connected through a resistor 5 of 6.8 kOhms to the negative supply voltage. Transistor 3' is of the pnp type and accordingly it has a polarity which is opposite to that of transistor 3; however, the resistors 4' in the collector lead and 5' in the emitter lead have the same values as resistors 4 and 5. The collector of the transistor 3(3') is connected to the base of a pnp- (npn-) transistor 6 (6') whose emitter is connected through a resistor 7 (7') of 470 Ohms to the positive (negative) supply voltage. The collectors of transistors 6 and 6' are connected together through a diode arranged in the pass direction. The collector voltages of transistors 6 and 6' are applied to the bases of transistors 8 and 8' which are of a conductivity type opposite to that of the transistors driving them. The collectors of transistors 8 and 8' are connected through resistors 9 and 9' to the bases of final transistors 10 and 10' which are again of a conductivity type which is opposite to that of the transistors driving them. The collectors of transistors 10 and 10' are connected together and the junction is connected to ground through the deflection coil 11 and a low-value resistor 12 of 2.2 Ohms. The final transistors are protected by diodes 15 and 15' from the voltage peaks occurring at the deflection coil when the current is reversed in polarity and when flashovers occur in the picture display tube, said diodes being connected in the blocking direction in parallel with the collector-emitter path of the final transistors. In case of a short circuit at the end of the final stage the driver current is limited by the resistors 9, 9'.

In case of a class B push-pull stage the output potential is normally highly dependent on the adjusted quiescent current which in turn is determined by the ambient temperature. In the present circuit arrangement this would give rise to the fact that the vertical position of the picture highly depends on the temperature. To avoid this, the bases of the final transistors 10 and 10' are connected through the series arrangement of diodes 13 and 13' arranged in the pass direction and resistors 14 and 14' to supply voltage terminal for their emitters. A resistor 16 of 47 kOhms arranged between the cathode of the diode 13 connected to the positive potential and the anode of the diode 13' connected to the negative potential ensures that the diodes 13 and 13' are always slightly biassed. As a result the base potential and the quiescent current of the final transistors 10 and 10' is determined by the bias voltage of these diodes when the input signal fails, hence when transistors 8 and 8' are cut off. Since this bias voltage is already very low and is even more reduced by the voltage drops at resistors 14 and 14', quiescent currents of a few $\mu$A can be adjusted. The distortions of the output signal to be expected at such a low quiescent current adjustment are eliminated in known manner (Austrian Pat. specification 245038) in that the bases of the final transistors are not connected to the emitters of the driver stages 8 and 8' but to their collectors so that the output resistance of the driver stages 8, 8' driving the final transistors 10, 10' is considerably larger than the input resistance of the final stages. The non-linearity of the input resistance therefore does not exert any influence on the course of the signal.

A voltage is derived from resistor 12 which is applied through resistors 17 and 17' to the emitters of input transistors 3 and 3'. The voltage 18 proportional to the deflection current derived from resistor 12 has the same phase and substantially also the same shape as the input signal 1 and therefore acts as a direct current feedback. The mean value of the deflection current and hence the position of the picture is determined in this circuit arrangement by the potential at the bases of transistors 3 and 3'. To adjust this potential a potentiometer connected to the supply voltage would be sufficient, while its wiper would be connected to the bases of the input transistors, but in this case the position of the picture would be greatly dependent on fluctuations in the supply voltage. Adjustment of the picture position substantially independent of supply voltage fluctuations is obtained when, as shown in the drawing, the base is connected to the wiper on a potentiometer 18' of 5 kOhms whose ends are connected to ground through resistors 19 and 19' of 22 kOhms and further resistors 20 and 20' of 330 Ohms, the junction of resistors 19, 20 and 19', 20' being connected through resistors 21 and 21', respectively, to the positive and negative potential, respectively. The amplifier and particularly the driver stages 8, 8' and the final stages 10, 10' are substantially insensitive to hum voltages so that the positive voltage of 24 volts and the negative voltage of −20 Volts need not be especially smooth. For the preliminary stages this smoothing may be effected in known manner by resistors 22 and 22' of 680 Ohms arranged in the supply lead which resistors together with capacitors 23 and 23' of 500 $\mu$F constitute a smoothing member.

It is achieved by the direct current feedback that the deflection current is adjusted such that the voltage fed back on the emitters of the input transistors 3 and 3' corresponds but for a small difference to the voltage at the bases of transistor 3 and 3' (for this reason the deflection current can be varied by varying the value of resistor 12 in case of a given amplitude of the input signal). As a result the deflection current has the same variation with time as the input signal 1 at least during the scan period. At the beginning of the flyback period the input voltage changes within a few microseconds from its positive to its negative maximum value; the deflection current can, however, not be reversed in polarity at the same rate. As a result the base-emitter voltage of the input transistors 3 varies substantially stepwise after the beginning of the flyback period when the input signal has already reached its negative peak value while the deflection current has only very slightly varied. The bases of the input transistors 3, 3' become thus considerably more negative so that the lower transistor 3' and at the same time the transistors 6', 8' , 10' conduct heavily while transistors, 3, 6, 8 and 10 are cut off. This voltage variation produces a negative voltage step, for example, at the interconnected emitters of driver transistor 8, 8' which emitters are connected to ground through a resistor 24 of 100 Ohms, said voltage step being applied to the input of a controllable switch 27 through a potential divider consisting of resistors 25 of 1 kOhm and 26 of 22 kOhms and having one end connected to the said emitters and the other end connected to the positive supply voltage, so that said switch then onducts. In the conducting state the switch 27 must conduct current in both directions; when using a transistors switch the collector-emitter path of the switching transistor may be connected for this purpose in parallel with a diode having an opposite pass direction and having such a polarity that it does not conduct during the scan period.

The current flowing through the deflection coil might alternatively be reversed in polarity when the deflection coil would be directly connected via the switch to the negative supply voltage. In case of a negative supply voltage of − 20 Volts, a deflection inductance of 30 mH and a deflection current of 1,2 A (peak-to-peak) a time of 1.8 ms would, however, be required for reversing the polarity of the deflection current; a flyback period of less than one ms is, however, desirable. This shorter flyback period could be obtained by increasing the negative and the positive supply voltage. Then, however, the dissipation of the final stage transistors 10, 10' would also be increased.

In the circuit arrangement shown in the drawing the duration of the flyback period is reduced by means of a clamping circuit without increase of dissipation of the final stage transistors. For this purpose the emitter of transistor 10', unlike the emitter of transistor 10 is not directly connected to the associated voltage supply terminal but through a diode 28 conducting in the pass direction. In addition the emitter of transistor 10' is connected through a large capacitor 29 of 250 $\mu$F to the end of the transistor switch not connected to the negative supply voltage, which end is simultaneously connected through a resistor 30 of 220 Ohms to the positive supply voltage terminal. The clamping circuit operates as follows:

During the scan period capacitor 29 is charged through resistor 30 and the diode 28, a voltage of +24 Volts occurring at the end of capacitor 29 connected to the switch and a voltage of approximately − 20 Volts occurring at the other end, so that a voltage of approximately 44 Volts is present at the capacitor. As soon as the transistor switch 27 conducts as a result of the steep-edged voltage step of the input voltage 1 the electrode of capacitor 29 which was positive (+ 24 Volts) up till that instant is connected to the negative supply voltage; this potential step is transferred to the other electrode of the capacitor which was previously at − 20 Volts and subsequently at approximately − 60 Volts. Diode 28 is blocked at this voltage.

At the beginning of the flyback period a negative voltage peak is produced at the end of the deflection coil 11 connected to the amplifier output, and this as a result of the sudden cut-off of the final stage transistor 10 which was still conducting relatively strongly at the end of the scan period. The negative voltage peak is limited by diode 15' to a voltage which is slightly more negative than − 60 Volts, for example, −60.6 Volts. The deflection current flows via diode 15' in the same direction as it did previously through transistor 10, but due to the negative voltage at the end of the deflection coil connected to the amplifier output it decreases to the value of zero. Subsequently, the current is reversed in polarity and flows through the collector-emitter path of the npn transistor 10' whose base also carries a positive voltage during the first part of the flyback period. The voltage at the deflection coil is then only slightly less negative than the voltage on the left-hand electrode of capacitor 29 due to the small voltage drop on the collector-emitter path of transistor 10', so that the deflection current furthermore decreases at approximately the same rate as during the first half of the flyback period, because substantially the same voltage is present at the deflection coil. Simultaneously also the voltage at resistor 12 decreases and hence the difference between the base-emitter voltages of the input transistors 3 and 3'. Consequently the lower half of the class B push-pull amplifier becomes less conducting so that the emitter potential of transistors 8 and 8' becomes again less negative. In case of suitable dimensioning of the potential divider 25, 26 and of the threshold at which the transistor switch 27 is opened again it can be achieved that opening is effected just at the instant when the deflection current has reached its required value. The capacitor 29 is still further charged during the first part of the flyback period and the more the lower its capacitance is, and during the second part of the flyback period it is discharged to the voltage present at the commencement of the flyback period. The mean value of the potential on the left-hand electrode of this capacitor is thus still more negative than − 60 Volts during the flyback period and the more as the capacitance of the capacitor is lower so that the deflection current is reversed in polarity at an even faster rate. However, restrictions are imposed in this case due to the dielectric strength of the final stage transistors; consequently, when the dielectric strength of transistors 10, 10' is only slightly more than 60 Volts, a capacitor having a high capacitance (250 $\mu$F) is to be used, as in the embodiment.

This circuit arrangement is insensitive to fluctuations during operation. When, for example, the negative and/or the positive supply voltage increases, the flyback duration decreases; accordingly the emitter potential of the driver transistors 8 and 8' reaches the positive threshold value more quickly so that the switch is opened again and the polarity reversal is interrupted as soon as the deflection current has reached its required value.

What is claimed is:

1. A circuit for generating an output deflection current for a deflection coil from an input sawtooth deflection voltage signal having a polarity changes at the start of the flyback period which are short with respect to said flyback period; said circuit comprising an amplifier having an input adapted to receive said input signal, and an output means adapted to be coupled to said coil for providing said output current; means coupled to said amplifier for generating a control voltage that is the difference between a voltage that is proportional to said input signal and a voltage that is proportional to said output current; a direct voltage source; and means for rendering said output current independent of voltage and load variations comprising means for reversing the polarity of said deflection current at the start of said flyback period including a switch means coupled to said amplifier and said source and having a control input coupled to said means for generating for coupling said coil to said source at the start of said flyback period and separating said coil from said source upon said deflection current reaching a selected value required for the start of the scan period.

2. A circuit as claimed in claim 1, wherein said amplifier comprises a junction having a potential that differs from a threshold value during said flyback period, said switch being coupled to said junction and switching at about said threshold value; and further comprising feedback means for applying said voltage proportional to said deflection current to said amplifier input.

3. A circuit as claimed in claim 2 wherein said junction potential goes below said threshold value during said flyback period, said switch switching above said threshold value.

4. A circuit as claimed in claim 2 wherein said junction potential exceeds said threshold value during said flyback period, said switch switching below said threshold value.

5. A circuit as claimed in claim 2 wherein said amplifier comprises first and second final stage class B push pull transistors, each of said transistors having emitter and collector conduction electrodes, a conduction electrode of one of said transistors being coupled to a like conduction electrode of said other transistor, said first transistor being conductive during said start of said scan period; a pass direction coupled diode having a first end coupled to first transistor conduction electrode, and a second end adapted to receive a first terminal of a power supply; a capacitor having a first end coupled to said diode first end, and a second end coupled to said switch; and a resistor having a first end coupled to said capacitor second end, and a second end adapted to receive a second terminal of said power supply.

6. A circuit as claimed in claim 5 wherein said like conduction electrodes comprise said collector electrodes and said diode first end is coupled to said first transistor emitter.

7. A circuit as claimed in claim 5 wherein said like conduction electrodes comprise said emitter electrodes and said diode first end is coupled to said first transistor collector.

8. A circuit as claimed in claim 5 further comprising a second cut off direction coupled diode having a first end coupled to a conduction electrode of said first transistor, and a second end coupled to the remaining conduction electrode of said first transistor.

* * * * *